US011879108B2

(12) United States Patent
Garcia Castro et al.

(10) Patent No.: US 11,879,108 B2
(45) Date of Patent: Jan. 23, 2024

(54) MIDDLE-PRESSURE POLYMERIZATION PROCESS FOR LIQUID ETHYLENE COPOLYMERS

(71) Applicant: BASF SE, Ludwigshafen am Rhein (DE)

(72) Inventors: Ivette Garcia Castro, Ludwigshafen am Rhein (DE); Wolfgang Grabarse, Ludwigshafen am Rhein (DE); Jan Strittmatter, Ludwigshafen am Rhein (DE); Rene Koschabek, Ludwigshafen am Rhein (DE); Robert Rupaner, Ludwigshafen am Rhein (DE)

(73) Assignee: BASF SE, Ludwigshafen am Rhein (DE)

( * ) Notice: Subject to any disclaimer, the term of this patent is extended or adjusted under 35 U.S.C. 154(b) by 165 days.

(21) Appl. No.: 17/600,797

(22) PCT Filed: Mar. 23, 2020

(86) PCT No.: PCT/EP2020/057931
§ 371 (c)(1),
(2) Date: Oct. 1, 2021

(87) PCT Pub. No.: WO2020/200866
PCT Pub. Date: Oct. 8, 2020

(65) Prior Publication Data
US 2022/0177799 A1 Jun. 9, 2022

(30) Foreign Application Priority Data
Apr. 4, 2019 (EP) .................... 19167227

(51) Int. Cl.
*C10M 107/28* (2006.01)
*C08F 220/18* (2006.01)
*C08F 210/02* (2006.01)
*C10M 145/14* (2006.01)

(52) U.S. Cl.
CPC ......... *C10M 107/28* (2013.01); *C08F 210/02* (2013.01); *C08F 220/1808* (2020.02); *C10M 145/14* (2013.01); *C08F 2800/20* (2013.01); *C10M 2205/022* (2013.01); *C10M 2209/0845* (2013.01)

(58) Field of Classification Search
CPC .............. C10M 107/28; C10M 145/14; C10M 2205/022; C10M 2209/0845; C08F 210/02; C08F 220/1808; C08F 2800/20
See application file for complete search history.

(56) References Cited

U.S. PATENT DOCUMENTS

| 3,089,897 A * | 5/1963 | Balmer ................. C08F 220/12 |
| | | 526/329 |
| 3,658,741 A | 4/1972 | Knutson et al. |
| 4,155,719 A | 5/1979 | Sweeney |
| 2010/0048439 A1 | 2/2010 | Maehling et al. |
| 2012/0005951 A1 | 1/2012 | Maehling et al. |

FOREIGN PATENT DOCUMENTS

| CA | 869589 A | 4/1971 |
| WO | 2018/024563 A1 | 2/2018 |
| WO | 2019/175300 A1 | 9/2019 |
| WO | 2019/175301 A1 | 9/2019 |

OTHER PUBLICATIONS

International Search Report and Written Opinion received for PCT Patent Application No. PCT/EP2020/057931, dated Jul. 8, 2020, 10 pages.

* cited by examiner

*Primary Examiner* — James C Goloboy
(74) *Attorney, Agent, or Firm* — Faegre Drinker Biddle & Reath LLP

(57) ABSTRACT

The present invention relates to a middle-pressure polymerization process for the preparation of a liquid ethylene copolymer which comprises in polymerized form 20 to 60 wt % of ethylene; and at least 20 wt % of an acrylate, which is selected from $C_1$-$C_{22}$ alkyl (meth)acrylate, where a monomer mix comprising the ethylene and the acrylate is polymerized at a pressure of 50 to 400 bar and in the presence of at least 2 wt % of a chain transfer agent. The invention further relates to a liquid ethylene copolymer obtainable by the polymerization process; and to a lubricant comprising the liquid ethylene copolymer obtainable by the polymerization process; and to a method for reducing friction between moving surfaces comprising the step of contacting the surfaces with the lubricant or with the ethylene copolymer.

15 Claims, No Drawings

MIDDLE-PRESSURE POLYMERIZATION PROCESS FOR LIQUID ETHYLENE COPOLYMERS

CROSS-REFERENCE TO RELATED APPLICATIONS

This application is a national stage application (under 35 U.S.C. § 371) of PCT/EP2020/057931, filed Mar. 23, 2020, which claims benefit of European Application No. 19167227.8, filed Apr. 4, 2019, both of which are incorporated herein by reference in their entirety.

DESCRIPTION

The present invention relates to a middle-pressure polymerization process for the preparation of a liquid ethylene copolymer which comprises in polymerized form 20 to 60 wt % of ethylene; and at least 20 wt % of an acrylate, which is selected from $C_1$-$C_{22}$ alkyl (meth)acrylate, where a monomer mix comprising the ethylene and the acrylate is polymerized at a pressure of 50 to 400 bar and in the presence of at least 2 wt % of a chain transfer agent. The invention further relates to a liquid ethylene copolymer obtainable by the polymerization process; and to a lubricant comprising the liquid ethylene copolymer obtainable by the polymerization process; and to a method for reducing friction between moving surfaces comprising the step of contacting the surfaces with the lubricant or with the ethylene copolymer. Combinations of preferred embodiments with other preferred embodiments are within the scope of the present invention.

Object was to find a polymerization process for the preparation of ethylene copolymers for lubricants, which should overcome the drawbacks of the prior art. For example the process should be stable, well controlled, reliable, scalable, or allow the production of the desired ethylene copolymer. The process should have a high space time yield, or a high acrylate content in the ethylene copolymer should be achievable. The process should avoid high pressure conditions which require special equipment and safety precautions. The process should allow the use of solvents and it should allow the use of various monomers. The process can be made semi-batch, so the polymerization can progress and the product is free of remaining monomers. Preferably, several of these objects should be achieved.

Further objects were to find an ethylene copolymer obtainable by the polymerization process or to find a lubricant comprising the liquid ethylene copolymer which should overcome the drawbacks of the prior art. For example the ethylene copolymers or the lubricant comprising the ethylene copolymers should be liquid, should have a low pour point, a good miscibility with apolar base stocks, a good miscibility with polar base stocks, a good oxidation stability, a high viscosity index, a low friction coefficient, a low volatility, a high chemical stability, a high shear stability, a viscosity index, a low sludge, a high cleanliness, a good thickening efficiency, a high hydrolytic stability, or good cold flow properties. Preferably, the ethylene copolymer or the lubricant comprising the ethylene copolymers should provide a combination of several of such advantages.

The object was solved by a middle-pressure polymerization process for the preparation of a liquid ethylene copolymer which comprises in polymerized form 20 to 60 wt % of ethylene; and at least 20 wt % of an acrylate, which is selected from $C_1$-$C_{22}$ alkyl (meth)acrylate, where a monomer mix comprising the ethylene and the acrylate is polymerized at a pressure of 50 to 400 bar and in the presence of at least 2 wt % of a chain transfer agent.

The object was also solved by the liquid ethylene copolymer obtainable by the polymerization process; and by a lubricant comprising the liquid ethylene copolymer obtainable by the polymerization process; and by a method for reducing friction between moving surfaces comprising the step of contacting the surfaces with the lubricant or with the ethylene copolymer.

The polymerization process may be a fed-batch process. Preferably, the polymerization process is a fed-batch process in which a reactor is partly filled with the ethylene and a solvent, followed by feeding of the acrylate, the chain transfer agent, and an initiator. The polymerization process may continue for at least 30 min, preferably at least 1 h, and in particular at least 2 h. The polymerization process may take 1 to 10 h, preferably 2-5 h.

The polymerization process may be carried out in stirred fed-batch autoclaves, hereinafter also referred to as semi-batch autoclaves.

The polymerization process may be carried out at a pressure in the range from 50 to 400 bar, preferably from 70 to 300 bar, and particularly 80 to 200 bar. In another form the polymerization process may be carried out at a pressure of at least 20, 30, 40, 50, 60, 70, 80, or 90 bar. In another form the polymerization process may be carried out at a pressure of up to 120, 140, 160, 180, 200, 220, 240, 260, 280 or 300 bar. Conditions of this type will hereinafter also be referred to as middle-pressure. The pressure can change during the polymerization.

The polymerization process may be carried out at a reaction temperature in the range of 50 to 200° C., preferably 70 to 140° C., and in particular 80 to 120° C.

The monomer mix may be polymerized in a polymerization solvent, such as in one or more hydrocarbons or one or more ketone(s) which are liquid at room temperature or mixtures of hydrocarbons (e.g. olefins or aromatic hydrocarbons such as toluene, ethylbenzene, ortho-xylene, meta-xylene and para-xylene, also cycloaliphatic hydrocarbons such as cyclohexane and aliphatic $C_6$-$C_{16}$-hydrocarbons, either branched or unbranched, for example n-heptane, n-octane, isooctane, n-decane, n-dodecane and in particular isododecane), ketones (e.g. acetone, methyl isobutyl ketone, ethyl methyl ketone). Preferred polymerization solvents are alphatic hydrocarbons, such as cyclohexane.

The monomer mix comprises the ethylene and the acrylate and optionally the chain transfer agent and optionally a solvent. The monomer mix may comprise the ethylene and the acrylate and optionally the further monomer in amounts which are suitable to arrive at the desired monomer amounts in the ethylene copolymer.

Usually, the monomer mix comprises at least 30 wt %, preferably at least 40 wt %, and in particular at least 50 wt % of ethylene, where the percentage is based on all monomers present in the monomer mix. In another form, the monomer mix comprises at least 30-90 wt %, preferably at least 40-80 wt %, and in particular at least 50-70 wt % of ethylene.

Usually, the monomer mix comprises at least 10 wt %, preferably at least 25 wt %, and in particular at least 35 wt % of acrylate, where the percentage is based on all monomers present in the monomer mix. In another form, the monomer feed comprises at least 10-70 wt %, preferably at least 20-60 wt %, and in particular at least 30-50 wt % of the acrylate.

The percentage of all monomers (e.g. ethylene, the acrylate and the further monomer) in the monomer mix usually sum up to 100%.

In another form the monomer mix comprises at least 30 wt % (e.g. at least 35, 40, 45, 50, 55, or 60 wt %) ethylene and at least 20 wt % (e.g. at least 25, 30, 35, 40 wt %) of the acrylate.

In another form the monomer mix comprises up to 90 wt % (e.g. up to 85, 80, 75, 70, or 65 wt %) ethylene and up to 70 wt % (e.g. up to 65, 60, 55, 50, 45, or 40 wt %) of the acrylate.

In another form the monomer mix comprises 30-90 wt % ethylene, 10-70 wt % of the acrylate, and optionally up to 20 wt % of further monomers, where the percentages of the monomers sum up to 100%.

In another form the monomer mix comprises 40-80 wt % ethylene, 20-60 wt % of the acrylate, and optionally up to 10 wt % of further monomers, where the percentages of the monomers sum up to 100%.

The conversion of the ethylene is usually around 15-70 wt %, preferably 25-55 wt % and in particular 30-45 wt %, based on the ethylene feed.

The percentage of the chain transfer agent can be based on the sum of the amounts of monomers (e.g. ethylene, the acrylate, optionally the further monomers) and the chain transfer agent. For example, a monomer feed of 15 kg/h ethylene and 3 kg/h acrylate and a feed of the chain transfer agent of 2 kg/h corresponds to the presence of 10 wt % of the chain transfer agent.

The monomer mix comprising the ethylene and the acrylate is polymerized in the presence of at least 2 wt %, preferably at least 4 wt %, and in particular at least 6 wt % of the chain transfer agent, e.g. in the polymerization zone. In another form the monomer mix comprising the ethylene and the acrylate may be polymerized in the presence of at least 2.1 wt %, or at least 2.3 wt %, or at least 2.5 wt %, or at least 3.0 wt %, or at least 3.5 wt %, or at least 4.0 wt %, or at least 4.5 wt %, or at least 5.0 wt %, or at least 5.5 wt %, or at least 6.0 wt %, or at least 6.5 wt %, or at least 7.0 wt % of the chain transfer agent.

In another form the monomer mix comprising the ethylene and the acrylate may be polymerized in the presence of up to 30 wt %, preferably up to 20 wt %, and in particular up to 15 wt % of the chain transfer agent.

In another form the monomer mix comprising the ethylene and the acrylate may be polymerized in the presence of 4 to 18 wt %, preferably 6 to 15 wt %, and in particular 6 to 13 wt % of the chain transfer agent.

In another form the monomer mix comprising the ethylene and the acrylate may be polymerized in the presence of 3.0 to 12 wt %, preferably 3.5 to 10 wt %, and in particular 4.0 to 9 wt % of the chain transfer agent.

Suitable chain transfer agents (also named regulator) in the sense of this invention are regulators which are terminating the growing of a polymer being incorporated as terminus of the polymer chain. Suitable regulators are saturated or unsaturated hydrocarbons, alcohols, thiols, ketones, aldehydes, amines, or hydrogen.

Among saturated and unsaturated hydrocarbons the chain transfer agents can be selected from pentane, hexane, cyclohexane, isododecane, propene, butene, pentene, cyclohexene, hexene, octene, decen and dodecen, and from aromatic hydrocarbons such as toluol, xylol, trimethyl-benzene, ethylbenzene, diethylbenzene, triethylbenzene, mixtures thereof.

Suitable ketones or aldehydes as chain transfer agents are aliphatic aldehydes or aliphatic ketones, such as regulators of the formula II

or mixtures thereof.

$R_a$ and $R_b$ are the same or different and are selected from hydrogen;

$C_1$-$C_6$-alkyl such as methyl, ethyl, n-propyl, isopropyl, n-butyl, isobutyl, sec-butyl, tert-butyl, n-pentyl, isopentyl, sec-pentyl, neopentyl, 1,2-dimethylpropyl, isoamyl, n-hexyl, isohexyl, sec-hexyl; more preferably $C_1$-$C_4$-alkyl such as methyl, ethyl, n-propyl, isopropyl, n-butyl, isobutyl, sec-butyl and tert-butyl;

$C_3$-$C_{12}$-cycloalkyl such as cyclopropyl, cyclobutyl, cyclopentyl, cyclohexyl, cycloheptyl, cyclooctyl, cyclononyl, cyclodecyl, cycloundecyl and cyclododecyl; preference is given to cyclopentyl, cyclohexyl and cycloheptyl.

The $R^a$ and $R^b$ radicals may also be covalently bonded to one another to form a 4- to 13-membered ring. For example, $R^a$ and $R^b$ together may form the following alkylene groups: —(CH$_2$)$_4$—, —(CH$_2$)$_5$—, —(CH$_2$)$_6$—, —(CH$_2$)$_7$—, —CH(CH$_3$)—CH$_2$—CH$_2$—CH(CH$_3$)— or —CH(CH$_3$)—CH$_2$—CH$_2$—CH$_2$—CH(CH$_3$)—.

Preferred ketones as chain transfer agents are acetone, methylethylketone, diethylketone and diamylketone.

Preferred aldehydes as chain transfer agents are acetaldehyde, propionaldehyde, butanol and pentanal.

Among alcohols the chain transfer agents are selected from the group consisting of methanol, ethanol, propanol, isopropanol, butanol and pentanol.

Among thiols the chain transfer agents maybe selected from mercaptoethanol to tetradecan-thiol. In another form suitable thiols are organic thio compounds, such as primary, secondary, or tertiary aliphatic thiols, such as, ethanethiol, n-propanethiol, 2-propanethiol, n-butanethiol, tert-butanethiol, 2-butanethiol, 2-methyl-2-propanethiol, n-pentanethiol, 2-pentanethiol, 3-penta-nethiol, 2-methyl-2-butanethiol, 3-methyl-2-butanethiol, n-hexanethiol, 2-hexanethiol, 3-hexan-ethiol, 2-methyl-2-pentanethiol, 3-methyl-2-pentanethiol, 4-methyl-2-pentanethiol, 2-methyl-3-pentanethiol, 3-methyl-3-pentanethiol, 2-ethylbutanethiol, 2-ethyl-2-butanethiol, n-heptanethiol and its isomeric compounds, n-octanethiol and its isomeric compounds, n-nonanethiol and its isomeric compounds, n-decanethiol and its isomeric compounds, n-undecanethiol and its isomeric compounds, n-dodecanethiol and its isomeric compounds, n-tridecanethiol and its isomeric compounds, substituted thiols, such as 2-hydroxyethanethiol, aromatic thiols, such as benzenethiol, ortho-, meta-, or para-methylbenzenethiol, mercaptoalkanoic acid and derivatives thereof, such as 6-methylheptyl 3-mercaptopropionate or 2-ethylhexyl 2-mercaptoethanoate.

Among amines the chain transfer agents are selected from primary, secondary, or tertiary amines, such as dialkyl amines or trialkyl amines. Examples for amines are propyl amine, dipropyl amine, dibutyl amine, triethyl amine.

Preferred chain transfer agents are saturated or unsaturated hydrocarbons, aliphatic ketones, aliphatic aldehydes, or hydrogen, or mixtures thereof.

In another preferred form the chain transfer agents are propene, butene, pentene, propionaldehyde, methylethylketone, isododecane, or hydrogen, or mixtures thereof.

In another preferred form the chain transfer agents are propionaldehyde, methyl ethyl ketone, or hydrogen, or mixtures thereof.

In another preferred form the chain transfer agents are mixtures of propionaldehyde and/or methylethylketone and/or hydrogen.

In another preferred form the chain transfer agents is propionaldehyde. In another preferred form the chain transfer agents is a mixture of propionaldehyde and methylethylketone.

The chain transfer agents can be diluted with suitable solvents (e.g. hydrocarbons), preferably they are used without additional solvents.

The polymerization process is usually a free-radical polymerization, and usually initiated an initiator. Suitable initiators are organic peroxides, oxygen or azo compounds. Mixtures of a plurality of free-radical initiators are also suitable.

Suitable peroxides are didecanoyl peroxide, 2,5-dimethyl-2,5-di(2-ethylhexanoylperoxy)hexane, tert-amyl peroxypivalate, tert-amyl peroxy-2-ethylhexanoate, dibenzoyl peroxide, tert-butyl peroxy-2-ethylhexanoate, tert-butyl peroxydiethylacetate, tert-butyl peroxydiethylisobutyrate, 1,4-di(tert-butylperoxycarbonyl)cyclohexane as isomer mixture, tert-butyl perisononanoate, 1,1-di(tert-butylperoxy)-3,3,5-trimethylcyclohexane, 1,1-di(tert-butylperoxy) cyclohexane, methyl isobutyl ketone peroxide, tert-butyl peroxyisopropylcarbonate, 2,2-di(tert-butylperoxy)butane or tert-butyl peroxacetate; tert-butyl peroxybenzoate, di-tert-amyl peroxide, dicumyl peroxide, the isomeric di-(tert-butylperoxyisopropyl)benzenes, 2,5-dimethyl-2,5-di-tert-butylperoxyhexane, tert-butyl cumyl peroxide, 2,5-dimethyl-2,5-di(tert-butylperoxy)hex-3-yne, di-tert-butylperoxide, 1,3-diisopropylbenzene monohydroperoxide, cumene hydroperoxide or tert-butyl hydro-peroxide, or dimeric or trimeric ketone peroxides.

As azo compound azodicarboxylic esters, azodicarboxylic dinitriles are suitable, mention may be made by way of example of azobisisobutyronitrile ("AIBN").

Preferred initiators are selected from the group consisting of di-tert-butyl peroxide, tert-amyl peroxypivalate, tert-butyl peroxypivalat, tert-butyl peroxyisononanoate, tert-butyl peroxy-2-ethyl-hexanoate, 2,2-di(tert-butylperoxy)butane and mixtures thereof. Preferably tert-amyl peroxypivalate is used as initiator.

Initiators, e.g. organic peroxides, are often admixed with solvents to make them easier to handle. In a preferred form the initiator is introduced in the form of a solution in one or more ketone(s) or hydrocarbons (especially olefins) which are liquid at room temperature. The initiator are preferably fed in as a 0.1-50% strength by weight solution, preferably a 0.5-20% strength by weight solution, in one or more hydrocarbons or one or more ketone(s) which are liquid at room temperature or mixtures of hydrocarbons (e.g. olefins or aromatic hydrocarbons such as toluene, ethylbenzene, ortho-xylene, meta-xylene and para-xylene, also cycloaliphatic hydrocarbons such as cyclohexane and aliphatic $C_6$-$C_{16}$-hydrocarbons, either branched or unbranched, for example n-heptane, n-octane, isooctane, n-decane, n-dodecane and in particular isododecane), ketones (e.g. acetone, methyl isobutyl ketone, ethyl methyl ketone). In cases where the solvents for the initiator are also function as regulators (e.g. ketones), then the amount of such regulator is included for calculating the wt % of the regulator in the monomer feed.

The amount of the initiator depends on the chemical nature of the initiator and can by adjusted by routine experiments. Typically, the initiator is present in 0.001 to 0.1 wt %, preferably 0.01 to 0.05 wt % based on the weight of the monomer feed.

The initiators employed herein can be introduced into the polymerization zone in any suitable manner, for example, by dissolving the initiator in a suitable solvent and injecting the initiator solution directly into the polymerization zone. Alternatively, the initiator may be injected into the feed stream, prior to introduction thereof into the polymerization zone. In the autoclave the initiator can be fed either in one point in the middle or twice: first in the upper part of the reactor and the second time either in the middle or in the bottom of the reactor. In addition three or more injections are possible.

The polymerization process may be followed by postpolymerization chemical reactions, such as a hydrogenation. The hydrogenation may be a homogeneous or heterogenous catalytic hydrogenation. Usually, the hydrogenation is achieved with molecular hydrogen in the presence of a transition metal catalyst (e.g. based on RH, Co, Ni, Pd, or Pt), which may be dissolved in solvents or supported on inorganic supports.

The ethylene copolymer is liquid, which usually means that it is liquid at room temperature, e.g. at 25° C.

The ethylene copolymers are usually not crystalline, so that in general no crystallization commencement temperature, $T_{CC}$, is measurable at T>15° C. with differential scanning calorimetry. Usually, a melt flow index cannot be determined with ethylene copolymers.

The ethylene copolymer may have a pour point below 25° C., preferably below 20° C., and in particular below 15° C. In another form the ethylene copolymer may have a pour point below 10° C., preferably below 5° C., and in particular below 0° C. The pour point may be determined according to ASTM D 97.

In one form the ethylene copolymer is considered liquid when its pour point is below 25° C., preferably below 20° C., and in particular below 15° C.

The ethylene copolymer may be clear liquid at room temperature, e.g. at 25° C. Typically, in a clear liquid no turbidity is visible.

The ethylene copolymer may have a cloud point of below 25° C., preferably below 20° C., and in particular below 15° C. The cloud point may be determined according to ISO 3015.

The ethylene copolymer may be miscible with a polyalphaolefine having a kinematic viscosity at 100° C. of about 6 cSt. This miscibility may be determined in a weight ratio of 50:50 at room temperature, e.g. 25° C. for 24 h.

The ethylene copolymer may have a viscosity index of at least 100, preferably at least 120, and in particular of at least 180. The viscosity index may be determined according to ASTM D2270.

The ethylene copolymer may have a kinematic viscosity at 40° C. from 200 to 30 000 mm$^2$/s (cSt), preferably from 500 to 10 000 mm$^2$/s, and in particular from 1000 to 5000 mm$^2$/s. The kinematic viscosity may be determined according to ASTM D445.

In another form the ethylene copolymer may have a kinematic viscosity at 40° C. from 700 to 4000 mm$^2$/s (cSt), preferably from 1000 to 3000 mm$^2$/s, and in particular from 1200 to 2500 mm$^2$/s.

In another form the ethylene copolymer may have a kinematic viscosity at 40° C. from 5000 to 50 000 mm$^2$/s (cSt), preferably from 10 000 to 35 000 mm$^2$/s, and in particular from 15 000 to 30 000 mm$^2$/s.

The ethylene copolymer may have a kinematic viscosity at 100° C. from 10 to 5000 mm$^2$/s (cSt), preferably from 30 to 3000 mm$^2$/s, and in particular from 50 to 2000 mm$^2$/s.

In another form the ethylene copolymer may have a kinematic viscosity at 100° C. from 50 to 500 mm$^2$/s (cSt), preferably from 80 to 350 mm$^2$/s, and in particular from 100 to 200 mm$^2$/s.

In another form the ethylene copolymer may have a kinematic viscosity at 100° C. from 200 to 3000 mm$^2$/s (cSt), preferably from 700 to 2500 mm$^2$/s, and in particular from 800 to 2100 mm$^2$/s.

The ethylene copolymer has usually a weight-average molecular weight $M_w$ in the range up to 35 000 g/mol, preferably up to 30 000 g/mol, and in particular up to 25 000 g/mol. In another form the ethylene copolymer has usually a weight-average molecular weight $M_w$ in the range from 1000 to 30 000 g/mol, preferably from 1500 to 25 000 g/mol, and in particular from 3000 to 25000 g/mol.

In another form the ethylene copolymer has usually a weight-average molecular weight $M_w$ in the range from 1 000 to 25 000 g/mol, preferably from 2 000 to 20 000 g/mol, and in particular from 3000 to 15 000 g/mol.

In another form the ethylene copolymer has usually a weight-average molecular weight $M_w$ in the range from 8 000 to 35 000 g/mol, preferably from 10 000 to 30 000 g/mol, and in particular from 12 000 to 25 000 g/mol.

The ethylene copolymer has usually a number-average molecular weight $M_n$ in the range up to 12000 g/mol, preferably up to 10000 g/mol, and in particular up to 7000 g/mol. In another form the ethylene copolymer has usually a number-average molecular weight $M_n$ in the range from 1000 to 12000 g/mol, preferably from 1200 to 9000 g/mol, and in particular from 1500 to 7000 g/mol. The Mw and Mn may be determined by GPC on calibrated columns.

In another form the ethylene copolymer has usually a number-average molecular weight $M_n$ in the range from 1000 to 10000 g/mol, preferably from 1500 to 8000 g/mol, and in particular from 1700 to 5000 g/mol.

In another form the ethylene copolymer has usually a number-average molecular weight $M_n$ in the range from 2000 to 15 000 g/mol, preferably from 3500 to 10 000 g/mol, and in particular from 4000 to 7000 g/mol.

The ethylene copolymer has usually a polydispersity ($M_w/M_n$) of at least 1, preferably in the range from 1.3 to 5, more preferably from 1.5 to 4, and most preferably from 1.8 to 3.8.

In another form the ethylene copolymer has usually a polydispersity in the range from 1.3 to 3.5, more preferably from 1.5 to 3.3, and most preferably from 1.9 to 3.0.

In another form the ethylene copolymer has usually a polydispersity in the range from 2.7 to 4.5, more preferably from 3.0 to 4.0, and most preferably from 3.2 to 3.8.

The liquid ethylene copolymer comprises in polymerized form 20 to 60 wt %, preferably 25 to 55 wt %, and in particular 30 to 50 wt % of ethylene.

In another form the liquid ethylene copolymer comprises in polymerized form at least 35, 40, 45, 50, 55, 60, 65, 70, 75, or 80 mol % of ethylene. In another form the liquid ethylene copolymer comprises in polymerized form 35 to 95 mol %, preferably 45 to 40 mol %, and in particular 55 to 88 mol % of ethylene. In another form the liquid ethylene copolymer comprises in polymerized form 60 to 95 mol %, preferably 65 to 40 mol %, and in particular 70 to 88 mol % of ethylene.

The liquid ethylene copolymer comprises in polymerized form at least 20 wt %, preferably at least 40 wt %, and in particular at least 50 wt % of the acrylate. The ethylene copolymer may comprise in polymerized form 30 to 80 wt %, preferably 40 to 75 wt %, and in particular 50 to 75 wt % of the acrylate. In another form the liquid ethylene copolymer comprises in polymerized form at least 20, 25, 30, 35, 40, 45, 50, or 55 wt % of the acrylate. In another form the liquid ethylene copolymer comprises in polymerized form less than 80, 75, 70, 65, 60, 55, or 50 wt % of the acrylate.

In another form the liquid ethylene copolymer may comprise in polymerized form at least 5 mol %, preferably at least 10 mol %, and in particular at least 15 mol % of the acrylate. In another form the liquid ethylene copolymer may comprise in polymerized form at least 5, 10, 15, 20, 25, 30, or 35 mol % of the acrylate. In another form the liquid ethylene copolymer may comprise in polymerized form less than 20, 25, 30, 35, 40, or 45 mol % of the acrylate. In another form the ethylene copolymer may comprise in polymerized form 5 to 50 mol %, preferably 10 to 45 mol %, and in particular 15 to 40 mol % of the acrylate.

The wt % or the mol % of the monomers, which are present in polymerized form in the ethylene copolymer, usually refers to the total amount of monomers which are present in polymerized form in the ethylene copolymer. Other compounds, such as radical starters or chain transfer agents, may be incorporated in the ethylene copolymer, but they are usually not considered for this calculation.

Usually, the sum of the wt % of ethylene and the acrylate (e.g. the polar and the unpolar acrylate) and optionally the further monomer is up to 100 wt %, preferably 80 to 100 wt %, in particular 95 to 100 wt %. In another form the sum of the wt % of ethylene and the acrylate is 100 wt %. Usually, the sum of the mol % of ethylene and the acrylate (e.g. the polar and the unpolar acrylate) and optionally the further monomer is up to 100 mol %, preferably 80 to 100 mol %, in particular 95 to 100 mol %. In another form the sum of the wt % of ethylene and the acrylate is 100 mol %.

The wt % or the mol % of ethylene and the acrylate (and optionally the further monomers) in the ethylene copolymer may be determined by H-NMR.

In one form the ethylene copolymer comprises in polymerized form
   25 to 55 wt % of ethylene, and
   at least 40 wt % of the acrylate, such as 40 to 75 wt %, and in particular 50 to 75 wt %.

In another form the ethylene copolymer comprises in polymerized form
   30 to 50 wt % of ethylene, and
   at least 50 wt % of the acrylate, such as 50 to 75 wt %.

In another form the ethylene copolymer comprises in polymerized form
   25 to 55 wt % of ethylene,
   at least 20 wt % of the polar acrylate, and
   at least 15 wt % of the unpolar acrylate.

In another form the ethylene copolymer comprises in polymerized form
   20 to 60 wt % of ethylene,
   20 to 50 wt % of the polar acrylate, and
   15 to 40 wt % of the unpolar acrylate.

In another form the ethylene copolymer comprises in polymerized form
   30 to 50 wt % of ethylene, 25 to 50 wt % of the polar acrylate, and
20 to 40 wt % of the unpolar acrylate.

In another form the ethylene copolymer comprises in polymerized form
25 to 55 wt % of ethylene,
at least 20 wt % of the polar acrylate which is selected from $C_1$-$C_4$ alkyl (meth)acrylate, and
at least 15 wt % of the unpolar acrylate which is selected from $C_6$-$C_{22}$ alkyl (meth)acrylate.

In another form the ethylene copolymer comprises in polymerized form
30 to 50 wt % of ethylene,
20 to 50 wt % of the polar acrylate which is selected from $C_1$-$C_4$ alkyl (meth)acrylate, and
15 to 40 wt % of the unpolar acrylate which is selected from $C_6$-$C_{22}$ alkyl (meth)acrylate.

In another form the ethylene copolymer comprises in polymerized form
25 to 55 wt % of ethylene,
at least 20 wt % of the polar acrylate which is selected from $C_3$-$C_4$ alkyl (meth)acrylate, and
at least 15 wt % of the unpolar acrylate which is selected from $C_8$-$C_{14}$ alkyl (meth)acrylate.

In another form the ethylene copolymer comprises in polymerized form
30 to 50 wt % of ethylene,
20 to 50 wt % of the polar acrylate which is selected from $C_3$-$C_4$ alkyl (meth)acrylate, and
15 to 40 wt % of the unpolar acrylate which is selected from $C_8$-$C_{12}$ alkyl (meth)acrylate.

The acrylate is selected from $C_1$-$C_{22}$ alkyl (meth)acrylate, preferably from $C_1$-$C_{22}$ alkyl acrylate. The acrylate may comprise at least one (meth)acrylate, such as one, two or three (meth)-acrylates. The acrylate is preferably selected from $C_2$-$C_{20}$ alkyl (meth)acrylate, and in particular from selected from $C_3$-$C_{18}$ alkyl (meth)acrylate. In another form the acrylate is preferably selected from $C_2$-$C_{20}$ alkyl acrylate, and in particular from selected from $C_3$-$C_{18}$ alkyl acrylate.

The term "(meth)acrylate" refers to esters or acrylic acid, methacrylic acid, or mixtures thereof. Preferably, the acrylate is selected from $C_1$-$C_{22}$ alkyl acrylate, in particular from $C_3$-$C_{18}$ alkyl acrylates.

The $C_1$-$C_{22}$ alkyl group of the $C_1$-$C_{22}$ alkyl (meth)acrylate (preferably of the the $C_1$-$C_{22}$ alkyl acrylate) may be saturated or unsaturated (preferably saturated), branched, cyclic or linear (preferably linear or branched) or mixtures thereof, such as methyl, ethyl, n-propyl, isopropyl, n-butyl, isobutyl, sec-butyl, tert-butyl, n-pen-tyl, isopentyl, sec-pentyl, neo-pentyl, 1,2-dimethyl-propyl, isoamyl, n-hexyl, isohexyl, sec-hexyl, cyclo-hexyl, n-heptyl, n-octyl, isooctyl, 2-ethylhexyl, n-nonyl, 2-propylheptyl, n-decyl, un-decyl, dodecyl, tridecyl, tetradecyl, pentadecyl, hexadecyl, heptadecyl, octadecyl, 2-butyloctyl, 2-pen-tylnonyl, 2-hexyldecyl, isohexyl, isoheptyl, isooctyl, isononyl, isodecyl, isoundecyl, isododecyl, isotridecyl, isotetradecyl, isopentadecyl, isohexadecyl, isoheptadecyl, isooctadecyl, and mixtures thereof.

The acrylate may comprise a polar acrylate and an unpolar acrylate. Preferably, the acrylate comprises
a polar acrylate selected from $C_1$-$C_5$ alkyl (meth)acrylate (preferably $C_1$-$C_5$ alkyl acrylate), and
an unpolar acrylate selected from $C_6$-$C_{22}$ alkyl (meth)acrylate (preferably $C_6$-$C_{22}$ alkyl acrylate).

The polar acrylate may be methyl (meth)acrylate, ethyl (meth)acrylate, n-propyl (meth)acrylate, or n-butyl (meth)acrylate, wherein n-butyl acrylate is preferred.

The unpolar acrylate may be preferably selected from $C_3$-$C_{18}$ alkyl (meth)acrylate, and in particular from $C_3$-$C_{12}$ alkyl (meth)acrylate.

Examples of the unpolar acrylate are (meth)acrylates of n-octyl, isooctyl, 2-ethylhexyl, n-nonyl, 2-propylheptyl, n-decyl, un-decyl, dodecyl, tridecyl, tetradecyl, pentadecyl, hexadecyl, heptadecyl, octadecyl, 2-butyloctyl, 2-pentylnonyl, 2-hexyldecyl, isohexyl, isoheptyl, isooctyl, isononyl, isodecyl, isoundecyl, isododecyl, isotridecyl, isotetradecyl, isopentadecyl, isohexadecyl, isoheptadecyl, isooctadecyl and mixtures thereof.

More preferably, the polar acrylate is selected from $C_3$-$C_4$ alkyl (meth)acrylate, and the unpolar acrylate selected from $C_3$-$C_{22}$ alkyl (meth)acrylate.

In particular, the polar acrylate is selected from $C_3$-$C_4$ alkyl acrylate, and the unpolar acrylate selected from $C_8$-$C_{22}$ alkyl acrylate.

The weight ratio of the unpolar acrylate to the polar acrylate may be from 10:90 to 70:30, preferably from 20:80 to 65:35, and in particular from 30:70 to 60:40.

The ethylene copolymer may comprise in polymerized form further monomers beside ethylene and the acrylate, such as up to 10 wt %, preferably up to 4 wt %, and in particular up to 2 wt % of all monomers. Preferably, the ethylene copolymer is free of further monomers beside the ethylene and the acrylate. In another form the ethylene copolymer may comprise less than 2 wt %, preferably less than 1 wt %, and in particular less than 0.3 wt % further monomers. In another form the ethylene copolymer may comprise in polymerized form less than 2 mol %, preferably less than 1 mol %, and in particular less than 0.5 mol % further monomers.

Examples for further monomers are
vinyl aromatic compounds, such as styrene, alpha-methyl styrene, vinyl toluene or p-(tert-butyl) styrene;
acrylamide and methacrylamide;
maleic acid and the imides and $C_1$ to $C_{14}$-alkyl or di alkyl esters thereof;
fumaric acid and the imides and $C_1$ to $C_{14}$-alkyl or di alkyl esters thereof;
itaconic acid and the imides and $C_1$ to $C_{10}$-alkyl esters thereof;
acrylonitrile and methacrylonitrile;
acrylates and methacrylates with functionalized chain such as dimethylaminoethyl methacrylate, dimethylaminopropyl methacrylate, diethylaminoethyl methacrylate, diethylaminopropyl methacrylate, dimethylaminoethyl acrylate, dimethylaminopropyl acrylate, diethylaminoethyl acrylate, diethylaminopropyl acrylate, tert-butylaminoethyl methacrylate, glycidyl methacrylate, phenoxyethyl acrylate, phenoxyethyl methacrylate, 2-morpholinoethyl methacrylate, hydroxyethyl methacrylate, hydroxypropyl methacrylate;
acrylamide derivatives such as as N,N-dimethylaminopropyl methacrylamide, N,N-di-methylaminopropyl acrylamide, N,N-dimethylacrylamide, N,N-diethylacrylamide;
vinyl derivatives such as vinylimidazol, vinylpyrrolidone, vinylformamide, vinylethers, propylvinylether, butylvinylether and cyclohexylvinylether.

Other suitable further monomers are $C_{24}$-$C_{40}$ alkyl(meth) acrylates, which are preferably branched, such as (meth) acrylates of 2-decyl-tetradecanol, 2-dodecyl-hexadecanol, tetradecyl-octadecanol.

Other suitable further monomers are polyolefin-based macromonomers, preferably the macromonomers according to WO 2018/024563, such as macromonomers of the following formula (III)

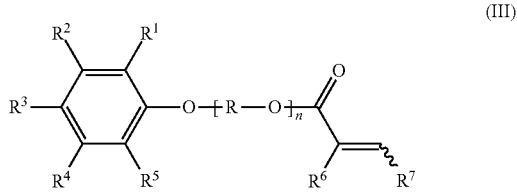

wherein $R^1$ to $R^5$ are each independently selected from the group consisting of H, $C_1$-$C_{20}$-Alkyl, $C_1$-$C_{20}$-Alkyloxy and $C_8$-$C_{3500}$-Polyisobutyl and $C_8$-$C_{3500}$-Polyisobutenyl,
R is a 2 to 10 carbon atoms comprising alkylene group,
$R^6$ is hydrogen or methyl,
$R^7$ is hydrogen, methyl or $COOR^8$,
$R^8$ is hydrogen or $C_1$-$C_{20}$-alkyl, and
n is a positive integer from 1 to 50,
with the provisio that at least of of the residues $R^1$ to $R^5$ is a $C_8$-$C_{3500}$-polyisobutyl or $C_8$-$C_{3500}$-polyisobutenyl.

In another form the further monomers are non-ionic monomers.

In another form the ethylene copolymer may be free of further monomers which are vinylester of the formula (I) in polymerized form

where $R^c$, $R^d$, and $R^e$ are each independently H or $C_1$-$C_4$-alkyl, and $R^f$ is $C_1$-$C_{20}$ alkyl. A suitable vinyl ester of the formula (I) is vinyl acetate. In another form the ethylene copolymer comprises less than 2 mol %, less than 1.5 mol %, less than 1.0 mol %, less than 0.5 mol % or less than 0.1 mol % of the vinylester of the formula (I), such as vinyl acetate. In another form the ethylene copolymer may be free of vinyl derivatives such as vinylester.

In another form the ethylene copolymer may comprise less than 5 wt %, preferably less than 1 wt %, and in particular less than 0.5 of an alkyl methacrylate in polymerized form (for example the ethylene copolymer is free of alkyl methacrylates) and the acrylate is selected from $C_1$-$C_{22}$ alkyl acrylate.

In another form the ethylene copolymer may be free of further monomers in polymerized form, which comprise a functional group, such as a functional group selected from carboxylic acid, sulfonic acid, phosphonic acid, amino, amide, imide, hydroxyl, and cyano. In another form the ethylene copolymer may comprise less than 5 wt %, preferably less than 1 wt %, and in particular less than 0.5 wt % further monomers in polymerized form, which comprise a functional group. In another form the ethylene copolymer may comprise in polymerized form less than 2 mol %, preferably less than 1 mol %, and in particular less than 0.5 mol % further monomers in polymerized form, which comprise a functional group.

In another form the ethylene copolymer may be free of further monomers which are vinylester of the formula (I) in polymerized form, and of further monomers in polymerized form, which comprise functional groups.

In another form the ethylene copolymer is free of further monomers in polymerized form, which comprise an ionic group (e.g. anionic, cationic, or zwitter ionic), such as a carboxylic acid, sulfonic acid, or phosphonic acid. In another form the ethylene copolymer may comprise less than 5 wt %, preferably less than 1 wt %, and in particular less than 0.5 wt % further monomers in polymerized form, which comprise an ionic group.

In another form the ethylene copolymer is free of further monomers in polymerized form, which comprise an acidic group, such as maleic acid, fumaric acid, itaconic acid, acrylic acid, and methacrylic acid. In another form the ethylene copolymer may comprise less than 5 wt %, preferably less than 1 wt %, and in particular less than 0.5 wt % further monomers in polymerized form, which comprise an acidic group, such as maleic acid, fumaric acid, itaconic acid, acrylic acid, and methacrylic acid. In another form the ethylene copolymer is free of acrylic acid and/or methacrylic acid in polymerized form. In another form the ethylene copolymer may comprise less than 5 wt %, preferably less than 1 wt %, and in particular less than 0.5 wt % of acrylic acid and/or methacrylic acid in polymerized form.

In another form the ethylene copolymer is free of further monomers in polymerized form, which comprise a hydroxyl group, such as hydroxyalkyl (meth)acrylates. In another form the ethylene copolymer may comprise less than 5 wt %, preferably less than 1 wt %, and in particular less than 0.5 wt % further monomers in polymerized form, which comprise a hydroxyl group, such as hydroxyalkyl (meth)acrylates. In another form the ethylene copolymer may be free of esters of unsaturated carboxylic acids in polymerized form containing at least one free hydroxyl group located in the part of the molecule derived from the alcohol.

The lubricant usually further comprises
a base oil selected from mineral oils, polyalphaolefins, polymerized and interpolymerized olefins, alkyl naphthalenes, alkylene oxide polymers, silicone oils, phosphate ester and carboxylic acid ester; and/or
a lubricant additive.

In one form the lubricant further comprises a base oil selected from mineral oils, polyalpha-olefins, polymerized and interpolymerized olefins, alkyl naphthalenes, alkylene oxide polymers, silicone oils, phosphate ester and carboxylic acid ester. In another form the lubricant usually further comprises a lubricant additive.

In one form the lubribant may comprise at least 10 wt %, preferably at least 30 wt % and in particular at least 60 wt % of the ethylene copolymer.

In another form the lubricant may comprise 10-99 wt %, preferably 30-95 wt % and in particular at least 60-95 wt % of the ethylene copolymer.

In another form the lubricant may comprise 1-90 wt %, preferably 5-50 wt % and in particular 20-50 wt % of the base oil.

In another form the lubricant may comprise at least 0.1 wt %, preferably at least 0.5 wt % and in particular at least 1 wt % of the ethylene copolymer.

In another form the lubricant may comprise 0.1-20 wt %, preferably 0.1-150 wt % and in particular at least 0.1-10 wt % of the ethylene copolymer.

In another form the lubricant may comprise 30-99.9 wt %, preferably 50-99 wt % and in particular 70-95 wt % of the base oil.

The lubricant may comprise up to 20 wt %, preferably up to 15 wt % and in particular up to 10 wt % of the lubricant additive.

In another form the lubricant may comprise 0.1-20 wt %, preferably 0.1-15 wt % and in particular at least 0.1-10 wt % of the lubricant additive.

Lubricants usually refers to composition which are capable of reducing friction between surfaces (preferably metal surfaces), such as surfaces of mechanical devices. A mechanical device may be a mechanism consisting of a device that works on mechanical principles. Suitable mechanical device are bearings, gears, joints and guidances. The mechanical device may be operated at temperatures in the range of −30 C to 80° C.

Lubricants are usually specifically formulated for virtually every type of machine and manufacturing process. The type and concentration of base oils and/or lubricant additives used for these lubricants may be selected based on the requirements of the machinery or process being lubricated, the quality required by the builders and the users of the machinery, and the government regulation. Typically, each lubricant has a unique set of performance requirements. In addition to proper lubrication of the machine or process, these requirements may include maintenance of the quality of the lubricant itself, as well as the effect of the lubricant's use and disposal on energy use, the quality of the environment, and on the health of the user.

Typical lubricants are automotive lubricants (e.g. gasoline engine oils, diesel engine oils, gas engine oils, gas turbine oils, automatic transmission fluids, gear oils) and industrial lubricants (e.g. industrial gear oils, pneumatic tool lubricating oil, high temperature oil, gas compressor oil, hydraulic fluids, metalworking fluids).

Examples for lubricants are axel lubrication, medium and heavy duty engine oils, industrial engine oils, marine engine oils, automotive engine oils, crankshaft oils, compressor oils, refrigerator oils, hydrocarbon compressor oils, very low-temperature lubricating oils and fats, high temperature lubricating oils and fats, wire rope lubricants, textile machine oils, refrigerator oils, aviation and aerospace lubricants, aviation turbine oils, transmission oils, gas turbine oils, spindle oils, spin oils, traction fluids, transmission oils, plastic transmission oils, passenger car transmission oils, truck transmission oils, industrial transmission oils, industrial gear oils, insulating oils, instrument oils, brake fluids, transmission liquids, shock absorber oils, heat distribution medium oils, transformer oils, fats, chain oils, minimum quantity lubricants for metalworking operations, oil to the warm and cold working, oil for water-based metalworking liquids, oil for neat oil metalworking fluids, oil for semi-synthetic metalworking fluids, oil for synthetic metalworking fluids, drilling detergents for the soil exploration, hydraulic oils, in biodegradable lubricants or lubricating greases or waxes, chain saw oils, release agents, molding fluids, gun, pistol and rifle lubricants or watch lubricants and food grade approved lubricants.

The lubricant has usually may have a kinematic viscosity at 40° C. of at least 10, 50, 100, 150, 200, 300, 400, 500, 600, 900, 1400, or 2000 mm$^2$/s. In another form the lubricant has usually may have a kinematic viscosity at 40° C. from 200 to 30 000 mm$^2$/s (cSt), preferably from 500 to 10 000 mm$^2$/s, and in particular from 1000 to 5000 mm$^2$/s.

The lubricant has usually may have a kinematic viscosity at 100° C. of at least 2, 3, 5, 10, 20, 30, 40, or 50 mm$^2$/s. In another form the lubricant may have a kinematic viscosity at 100° C. from 10 to 5000 mm$^2$/s (cSt), preferably from 30 to 3000 mm$^2$/s, and in particular from 50 to 2000 mm$^2$/s The lubricant may have a viscosity index of at least 50, 75, 100, 120, 140, 150, 160, 170, 180, 190 or 200.

The lubricant is usually a lubricating liquid, lubricating oil or lubricating grease.

The base oil may selected from the group consisting of mineral oils (Group I, II or III oils), polyalphaolefins (Group IV oils), polymerized and interpolymerized olefins, alkyl naphthalenes, alkylene oxide polymers, silicone oils, phosphate esters and carboxylic acid esters (Group V oils). Preferably, the base oil is selected from Group I, Group II, Group III base oils according to the definition of the API, or mixtures thereof. Definitions for the base oils are the same as those found in the American Petroleum Institute (API) publication "Engine OH Licensing and Certification System", Industry Services Department, Fourteenth Edition, December 1996, Addendum 1, December 1998. Said publication categorizes base oils as follows:

a) Group I base oils contain less than 90 percent saturates (ASTM D 2007) and/or greater than 0.03 percent sulfur (ASTM D 2622) and have a viscosity index (ASTM D 2270) greater than or equal to 80 and less than 120.

b) Group II base oils contain greater than or equal to 90 percent saturates and less than or equal to 0.03 percent sulfur and have a viscosity index greater than or equal to 80 and less than 120.

c) Group III base oils contain greater than or equal to 90 percent saturates and less than or equal to 0.03 percent sulfur and have a viscosity index greater than or equal to 120.

d) Group IV base oils contain polyalphaolefins. Polyalphaolefins (PAO) include known PAO materials which typically comprise relatively low molecular weight hydrogenated polymers or oligomers of alphaolefins which include but are not limited to C2 to about C32 alphaolefins with the C8 to about C16 alphaolefins, such as 1-octene, 1-decene, 1-dodecene and the like being preferred. The preferred polyalphaolefins are poly-1-octene, poly-1-decene, and poly-1-dode-cene.

e) Group V base oils contain any base oils not described by Groups I to IV. Examples of Group V base oils include alkyl naphthalenes, alkylene oxide polymers, silicone oils, and phosphate esters.

Synthetic base oils include hydrocarbon oils and halo-substituted hydrocarbon oils such as polymerized and inter-polymerized olefins (e.g., polypropylenes, propylene-isobutylene copolymers, chlorinated polybutylenes, poly(1-hexenes), poly(1-octenes), poly(1-decenes)); alkylbenzenes (e.g., dodecylbenzenes, tetradecylbenzenes, dinonylbenzenes, di(2-ethylhexyl)benzenes); poly-phenyls (e.g., biphenyls, terphenyls, alkylated polyphenols); and alkylated diphenyl ethers and alkylated diphenyl sulfides and derivative, analogs and homologs thereof.

Alkylene oxide polymers and interpolymers and derivatives thereof where the terminal hydroxyl groups have been modified by esterification, etherification, etc., constitute another class of known synthetic base oils. These are exemplified by polyoxyalkylene polymers prepared by polymerization of ethylene oxide or propylene oxide, and the alkyl and aryl ethers of polyoxyalkylene polymers (e.g., methyl-polyiso-propylene glycol ether having a molecular weight of 1000 or diphenyl ether of polyethylene glycol having a molecular weight of 1000 to 1500); and mono- and polycarboxylic esters thereof, for example, the acetic acid esters, mixed C3-C8 fatty acid esters and C13 oxo acid diester of tetraethylene glycol.

Silicon-based oils such as the polyalkyl-, polyaryl-, poly-alkoxy- or polyaryloxysilicone oils and sili-cate oils comprise another useful class of synthetic base oils; such base oils include tetraethyl silicate, tetraisopropyl silicate, tetra-(2-ethylhexyl)silicate, tetra-(4-methyl-2-ethylhe-xyl) silicate, tetra-(p-tert-butyl-phenyl) silicate, hexa-(4-methyl-2-ethylhexyl)disiloxane, poly(methyl) siloxanes and poly (methylphenyl)siloxanes. Other synthetic base oils include liquid esters of phosphorous-containing acids (e.g., tricresyl phosphate, trioctyl phosphate, diethyl ester of decylphosphonic acid) and polymeric tetrahydrofurans.

Suitable lubricant additives may be selected from viscosity index improvers, polymeric thickeners, antioxidants, corrosion inhibitors, detergents, dispersants, anti-foam agents, dyes, wear protection additives, extreme pressure additives (EP additives), anti-wear additives (AW additives), friction modifiers, metal deactivators, pour point depressants.

The viscosity index improvers include high molecular weight polymers that increase the relative viscosity of an oil at high temperatures more than they do at low temperatures. Viscosity index improvers include polyacrylates, polymethacrylates, alkylmethacrylates, vinylpyrrolidone/me-thacrylate copolymers, poly vinylpyrrolidones, polybutenes, olefin copolymers such as an ethylene-propylene copolymer or a styrene-butadiene copolymer or polyalkene such as RIB, styrene/acrylate copolymers and polyethers, and combinations thereof. The most common VI improvers are methacrylate polymers and copolymers, acrylate polymers, olefin polymers and copolymers, and styrenebutadiene copolymers. Other examples of the viscosity index improver include polymethacrylate, polyisobutylene, alpha-olefin polymers, alpha-olefin copolymers (e.g., an ethylenepropylene copolymer), polyalkylstyrene, phenol condensates, naphthalene condensates, a styrenebutadiene copolymer and the like. Of these, polymethacrylate having a number average molecular weight of 10000 to 300000, and alpha-olefin polymers or alpha-olefin copolymers having a number average molecular weight of 1000 to 30000, particularly ethylene-alpha-olefin copolymers having a number average molecular weight of 1000 to 10000 are preferred. The viscosity index increasing agents can be added and used individually or in the form of mixtures, conveniently in an amount within the range of from ≥0.05 to ≤20.0% by weight, in relation to the weight of the base stock.

Suitable (polymeric) thickeners include, but are not limited to, polyisobutenes (PIB), oligomeric co-polymers (OCPs), polymethacrylates (PMAs), copolymers of styrene and butadiene, or high viscosity esters (complex esters).

Antioxidants include phenolic antioxidants such as hindered phenolic antioxidants or non-phenolic oxidation inhibitors.

Useful phenolic antioxidants include hindered phenols. These phenolic antioxidants may be ashless (metal-free) phenolic compounds or neutral or basic metal salts of certain phenolic compounds. Typical phenolic antioxidant compounds are the hindered phenolics which are the ones which contain a sterically hindered hydroxyl group, and these include those derivatives of dihydroxy aryl compounds in which the hydroxyl groups are in the o- or p-position to each other. Typical phenolic antioxidants include the hindered phenols substituted with alkyl groups having 6 carbon atoms or more and the alkylene coupled derivatives of these hindered phenols. Examples of phenolic materials of this type 2-t-butyl-4-heptyl phenol; 2-t-butyl-4-octyl phenol; 2-t-butyl-4-dodecyl phenol; 2,6-di-t-butyl-4-heptyl phenol; 2,6-di-t-butyl-4-dodecyl phenol; 2-methyl-6-t-butyl-4-heptyl phenol; and 2-methyl-6-t-butyl-4-dodecyl phenol. Other useful hindered mono-phenolic antioxidants may include for example hindered 2,6-di-alkyl-phenolic propionic ester derivatives. Bis-phenolic antioxidants may also be used in combination with the present invention. Examples of ortho-coupled phenols include: 2,2'-bis(4-heptyl-6-t-butyl-phenol); 2,2'-bis(4-octyl-6-t-butyl-phenol); and 2,2'-bis(4-dodecyl-6-t-butyl-phenol). Para-coupled bisphenols include for example 4,4'-bis(2,6-di-t-butyl phenol) and 4,4'-methylene-bis(2,6-di-t-butyl phenol).

Non-phenolic oxidation inhibitors which may be used include aromatic amine antioxidants and these may be used either as such or in combination with phenolics. Typical examples of non-phenolic antioxidants include: alkylated and non-alkylated aromatic amines such as aromatic mono-amines of the formula $R^8R^9R^{10}N$, where $R^8$ is an aliphatic, aromatic or substituted aromatic group, $R^9$ is an aromatic or a substituted aromatic group, and $R^{10}$ is H, alkyl, aryl or $R^{11}S(O)_xR^{12}$, where $R^{11}$ is an alkylene, alkenylene, or aralkylene group, $R^{12}$ is a higher alkyl group, or an alkenyl, aryl, or alkaryl group, and x is 0, 1 or 2. The aliphatic group $R^8$ may contain from 1 to about 20 carbon atoms, and preferably contains from about 6 to 12 carbon atoms. The aliphatic group is a saturated aliphatic group. Preferably, both $R^8$ and $R^9$ are aromatic or substituted aromatic groups, and the aromatic group may be a fused ring aromatic group such as naphthyl. Aromatic groups $R^8$ and $R^9$ may be joined together with other groups such as S.

Typical aromatic amines antioxidants have alkyl substituent groups of at least about 6 carbon atoms. Examples of aliphatic groups include hexyl, heptyl, octyl, nonyl, and decyl. Generally, the aliphatic groups will not contain more than about 14 carbon atoms. The general types of amine antioxidants useful in the present compositions include diphenylamines, phenyl naphthylamines, phenothiazines, imidodibenzyls and diphenyl phenylene diamines. Mixtures of two or more aromatic amines are also useful. Polymeric amine antioxidants can also be used. Particular examples of aromatic amine antioxidants useful in the present invention include:

p,p'-dioctyldiphenylamine; t-octylphenyl-alpha-naphthylamine; phenyl-alphanaphthylamine; and p-octylphenyl-alpha-naphthylamine. Sulfurized alkyl phenols and alkali or alkaline earth metal salts thereof also are useful antioxidants.

Corrosion inhibitors may include various oxygen-, nitrogen-, sulfur-, and phosphorus-containing materials, and may include metal-containing compounds (salts, organometallics, etc.) and nonmetal-containing or ashless materials. Corrosion inhibitors may include, but are not limited to, additive types such as, for example, hydrocarbyl-, aryl-, alkyl-, arylalkyl-, and alkylaryl-versions of detergents (neutral, overbased), sulfonates, phenates, salicylates, alcoholates, carboxylates, salixarates, phosphites, phosphates, thiophosphates, amines, amine salts, amine phosphoric acid salts, amine sulfonic acid salts, alkoxylated amines, etheramines, polyether-amines, amides, imides, azoles, diazoles, triazoles, benzotriazoles, benzothiadoles, mercapto-benzothiazoles, tolyltriazoles (TTZ-type), heterocyclic amines, heterocyclic sulfides, thiazoles, thiadiazoles, mercaptothiadiazoles, dimercaptothiadiazoles (DMTD-type), imidazoles, benzimidazoles, dithiobenzimidazoles, imidazolines, oxazolines, Mannich reactions products, glycidyl ethers, anhydrides, carbamates, thiocarbamates, dithiocarbamates, polyglycols, etc., or mixtures thereof.

Detergents include cleaning agents that adhere to dirt particles, preventing them from attaching to critical surfaces. Detergents may also adhere to the metal surface itself to keep it clean and prevent corrosion from occurring. Detergents include calcium alkylsalicylates, calcium alkylphenates and calcium alkarylsulfonates with alternate metal ions used such as magnesium, barium, or sodium. Examples of the cleaning and dispersing agents which can be used include metal-based detergents such as the neutral and basic alkaline earth metal sulphonates, alkaline earth metal phenates and alkaline earth metal salicylates alkenylsuccinimide and alkenylsuccinimide esters and their borohydrides, phenates, salienius complex detergents and ashless dispersing agents which have been modified with sulphur compounds. These agents can be added and used individually or in the form of mixtures, conveniently in an amount within the range of from ≥0.01 to ≤1.0% by weight in relation to the weight of the base stock; these can also be high total base number (TBN), low TBN, or mixtures of high/low TBN.

Dispersants are lubricant additives that help to prevent sludge, varnish and other deposits from forming on critical surfaces. The dispersant may be a succinimide dispersant (for example N-substituted long chain alkenyl succinimides), a Mannich dispersant, an ester-containing dispersant, a condensation product of a fatty hydrocarbyl monocarboxylic acylating agent with an amine or ammonia, an alkyl amino phenol dispersant, a hydrocarbyl-amine dispersant, a polyether dispersant or a polyetheramine dispersant. In one embodiment, the succinimide dispersant includes a polyisobutylene-substituted succinimide, wherein the polyisobutylene from which the dispersant is derived may have a number average molecular weight of about 400 to about 5000, or of about 950 to about 1600. In one embodiment, the dispersant includes a borated dispersant. Typically, the borated dispersant includes a succinimide dispersant including a polyisobutylene succinimide, wherein the polyisobutylene from which the dispersant is derived may have a number average molecular weight of about 400 to about 5000. Borated dispersants are described in more detail above within the extreme pressure agent description.

Anti-foam agents may be selected from silicones, polyacrylates, and the like. The amount of anti-foam agent in the lubricant compositions described herein may range from ≥0.001 wt.-% to ≤0.1 wt.-% based on the total weight of the formulation. As a further example, an anti-foam agent may be present in an amount from about 0.004 wt.-% to about 0.008 wt.-%.

Suitable extreme pressure agent is a sulfur-containing compound. In one embodiment, the sulfur-containing compound may be a sulfurised olefin, a polysulfide, or mixtures thereof. Examples of the sulfurised olefin include a sulfurised olefin derived from propylene, iso-butylene, pentene; an organic sulfide and/or polysulfide including benzyldisulfide; bis-(chlorobenzyl) disulfide; dibutyl tetrasulfide; di-tertiary butyl polysulfide; and sulfurised methyl ester of oleic acid, a sulfurised alkylphenol, a sulfurised dipentene, a sulfurised terpene, a sulfurised Diels-Alder adduct, an alkyl sulphenyl N'N-dialkyl dithiocarbamates; or mixtures thereof. In one embodiment, the sulfurised olefin includes a sulfurised olefin derived from propylene, isobutylene, pentene or mixtures thereof. In one embodiment the extreme pressure additive sulfur-containing compound includes a dimercaptothiadiazole or derivative, or mixtures thereof. Examples of the dimercaptothiadiazole include compounds such as 2,5-dimercapto-1,3,4-thiadiazole or a hydrocarbyl-substituted 2,5-dimercapto-1,3,4-thiadiazole, or oligomers thereof. The oligomers of hydrocarbyl-substituted 2,5-dimercapto-1,3,4-thiadiazole typically form by forming a sulfur-sulfur bond between 2,5-dimercapto-1,3,4-thiadiazole units to form derivatives or oligomers of two or more of said thiadiazole units. Suitable 2,5-dimercapto-1,3,4-thiadiazole derived compounds include for example 2,5-bis(tert-nonyldithio)-1,3,4-thiadiazole or 2-tert-nonyldithio-5-mercapto-1,3,4-thiadiazole. The number of carbon atoms on the hydrocarbyl substituents of the hydrocarbyl-substituted 2,5-dimercapto-1,3,4-thiadiazole typically include 1 to 30, or 2 to 20, or 3 to 16. Extreme pressure additives include compounds containing boron and/or sulfur and/or phosphorus. The extreme pressure agent may be present in the lubricant compositions at 0 wt.-% to about 20 wt.-%, or at about 0.05 wt.-% to about 10.0 wt.-%, or at about 0.1 wt.-% to about 8 wt.-% of the lubricant composition.

Examples of anti-wear additives include organo borates, organo phosphites such as didodecyl phosphite, organic sulfur-containing compounds such as sulfurized sperm oil or sulfurized terpenes, zinc dialkyl dithiophosphates, zinc diaryl dithiophosphates, phosphosulfurized hydrocarbons and any combinations thereof.

Friction modifiers may include metal-containing compounds or materials as well as ashless compounds or materials, or mixtures thereof. Metal-containing friction modifiers include metal salts or metal-ligand complexes where the metals may include alkali, alkaline earth, or transition group metals. Such metal-containing friction modifiers may also have low-ash characteristics. Transition metals may include Mo, Sb, Sn, Fe, Cu, Zn, and others. Ligands may include hydrocarbyl derivative of alcohols, polyols, glycerols, partial ester glycerols, thiols, carboxylates, carbamates, thiocarbamates, dithiocarbamates, phosphates, thiophosphates, dithiophosphates, amides, imides, amines, thiazoles, thiadiazoles, dithiazoles, diazoles, triazoles, and other polar molecular functional groups containing effective amounts of O, N, S, or P, individually or in combination. In particular, Mo-containing compounds can be particularly effective such as for example Mo-dithiocarbamates, Mo(DTC), Mo-dithiophosphates, Mo(DTP), Mo-amines, Mo (Am), Mo-alcoholates, Mo-alcohol-amides, and the like.

Ashless friction modifiers may also include lubricant materials that contain effective amounts of polar groups, for example, hydroxyl-containing hydrocarbyl base oils, glycerides, partial glycerides, glyceride derivatives, and the like. Polar groups in friction modifiers may include hydrocarbyl groups containing effective amounts of O, N, S, or P, individually or in combination. Other friction modifiers that may be particularly effective include, for example, salts (both ash-containing and ashless derivatives) of fatty acids, fatty alcohols, fatty amides, fatty esters, hydroxyl-containing carboxylates, and comparable synthetic long-chain hydrocarbyl acids, alcohols, amides, esters, hydroxy carboxylates, and the like. In some instances, fatty organic acids, fatty amines, and sulfurized fatty acids may be used as suitable friction modifiers. Examples of friction modifiers include fatty acid esters and amides, organo molybdenum compounds, molybdenum dialkylthiocarbamates and molybdenum dialkyl dithiophosphates.

Suitable metal deactivators include benzotriazoles and derivatives thereof, for example 4- or 5-alkylbenzotriazoles (e.g. triazole) and derivatives thereof, 4,5,6,7-tetrahydrobenzotriazole and 5,5'-methylenebisbenzotriazole; Mannich bases of benzotriazole or triazole, e.g. 1-[bis(2-ethyl-hexyl) aminomethyl) triazole and 1-[bis(2-ethylhexyl) aminomethyl)benzotriazole; and alkoxyal-kylbenzotriazoles such as 1-(nonyloxymethyl)benzotriazole, 1-(1-butoxyethyl) benzotriazole and 1-(1-cyclohexyloxybutyl) triazole, and combinations thereof. Additional non-limiting examples of the one or more metal deactivators include 1,2,4-triazoles and derivatives thereof, for example 3-alkyl(or aryl)-1, 2,4-triazoles, and Mannich bases of 1,2,4-triazoles, such as 1-[bis(2-ethylhexyl) aminomethyl-1,2,4-triazole; alkoxyalkyl-1,2,4-triazoles such as 1-(1-butoxyethyl)-1,2,4-triazole; and acylated 3-amino-1,2,4-triazoles, imidazole derivatives, for example 4,4'-methylenebis(2-undecyl-5-methylimidazole) and bis[(N-methyl) imidazol-2-yl]car-binol octyl ether, and combinations thereof. Further non-limiting examples of the one or more metal deactivators include sulfur-containing heterocyclic compounds, for example 2-mercapto-benzothiazole, 2,5-dimercapto-1,3,4-thia-diazole and derivatives thereof; and 3,5-bis[di(2-ethylhexyl) aminomethyl]-1,3,4-thiadiazolin-2-one, and combinations thereof. Even further non-limiting examples of the one or more metal deactivators include amino compounds, for example salicylidenepropylenediamine, salicylami-noguanidine and salts thereof, and combinations thereof. The one or more metal deactivators are not particularly limited in amount in the composition but are typically present in an amount of from about 0.01 to about 0.1, from about 0.05 to about 0.01, or from about 0.07 to about 0.1, wt.-% based on the weight of the composition. Alternatively, the one or more metal deactivators may be present in amounts of less than about 0.1, of less than about 0.7, or less than about 0.5, wt.-% based on the weight of the composition.

Pour point depressants (PPD) include polymethacrylates, alkylated naphthalene derivatives, and combinations thereof. Commonly used additives such as alkylaromatic polymers and polymethacrylates are also useful for this purpose. Typically, the treat rates range from ≥0.001 wt.-% to ≤1.0 wt.-%, in relation to the weight of the base stock.

Demulsifiers include trialkyl phosphates, and various polymers and copolymers of ethylene glycol, ethylene oxide, propylene oxide, or mixtures thereof.

The invention further relates to a method for reducing friction between moving surfaces (e.g. metal surfaces) comprising the step of contacting the surfaces with the lubricant or with the ethylene copolymer.

The friction may be determined by measuring the friction coefficient at 25% slide roll ratio (SRR) using mini-traction machine (MTM) measurements at 70° C. and 1 GPa.

The ethylene copolymer according to the invention may be used for many purposes in lubricants, e.g. for increasing the viscosity index of the lubricant, for thickening of the lubricant, for improving the coefficient of friction of the lubricant, for reducing wear, or as a base stock for the lubricant.

EXAMPLES

NBA: N-butyl acrylate,
EHA: 2-Ethylhexyl acrylate, commercially available from BASF SE.
LA: Lauryl acrylate (60:40 mixture of $C_{12}:C_{14}$ alkyl acrylates)

Preparation of Copolymers

In an autoclave 720 g cyclohexane was initially added, and then ethylene ("E") was fed under a pressure of 60 bar. The mixture was heated under stirring to 100° C. and further ethylene were added at a pressure of 100 bar. Feed 1 (26.6 g tert-butylperoxypivalate and 53 g cyclohexane) and Feed 2 (400 g acrylate and 80 g propionaldehyde) were fed to the reaction mixture during two hours. The reaction mixture cooled down and the cyclohexane was destilled off under vacuum. Detailed reaction conditions are summarized in Table 1.

TABLE 1

Reaction conditions

| Ex. | Monomers | P [bar] | T [° C.] | Ethylene feed [g] | Acrylate Feed [g] | Propionaldehyde [wt %] |
|---|---|---|---|---|---|---|
| 1 | E - EHA | 100 | 100 | 543 | 400 | 7.8 wt % |
| 2 | E - NBA - EHA | 100 | 100 | 519 | 200 NBA 200 LA | 8.0 wt % |
| 3 | E - NBA - LA | 100 | 100 | 539 | 200 NBA 200 LA | 7.9 wt % |

Characterization of the Liquid Ethylene Copolymers

The molecular weight number distribution Mn and the molecular weight weight distribution Mw were determined via GPC. The polydispersity was calculated as PD=(Mw/Mn). The GPC analysis was made with a RI detector, a PLgel MIXED-B column (column temperature 35° C.) and THF with 0.1% trifluor acetic acid as elution medium. The calibration was done with very narrow distributed polystyrene standards from the Polymer Laboratories with a molecular weights M=from 580 until 6.870.000 g/mol.

The Cloud Point CP was determined according to ISO 3015. The Pour Point PP was determined according to ASTM D 97.

The results demonstrated that all ethylene copolymers were liquid at room temperature and had a pour point below 25° C.

The results further indicate that all ethylene copolymers tend to have good low temperature characteristics.

The amounts of monomomers which are present in polymerized form in the polymer was determined by H-NMR and shown in Table 2.

TABLE 2

Analytical data of copolymers

| Ex. | Monomers | Amounts [wt %] | Mn [g/mol] | Mw [g/mol] | PD | PP [° C.] | CP [° C.] |
|---|---|---|---|---|---|---|---|
| 1 | E - EHA | 38.5:61.5 | 1730 | 5100 | 2.9 | −24 | 22 |
| 2 | E - NBA - EHA | 33:31:36 | 2100 | 5710 | 2.7 | −21 | −48 |
| 3 | E - NBA - LA | 35:33:32 | 2180 | 5800 | 2.7 | −18 | −9 |

Viscosity and Appearance of the Liquid ethylene Copolymers

The Kinematic Viscosity at 40° C. (V40) and at 100° C. (V100) were determined according to ASTM D 445. The Viscosity Index (VI) was determined according to ASTM D 2270.

The results demonstrated that the ethylene copolymers have a desired high kinematic viscosity, as well as a desired high viscosity index.

TABLE 3

Viscosity data

| Ex. | Monomers | Amounts [wt %] | V40 [mm$^2$/s] | V100 [mm$^2$/s] | VI |
|---|---|---|---|---|---|
| 1 | E - EHA | 38.5:61.5 | 768 | 64 | 152 |
| 2 | E - NBA - EHA | 33:31:36 | 1155 | 86 | 153 |

TABLE 3-continued

Viscosity data

| Ex. | Monomers | Amounts [wt %] | V40 [mm$^2$/s] | V100 [mm$^2$/s] | VI |
|---|---|---|---|---|---|
| 3 | E - NBA - LA | 35:33:32 | 633 | 61 | 166 |

Miscibility with Polyalphaolefins

The liquid ethylene copolymers were mixed with polyalphaolefine having a kinematic viscosity at 100° C. of about 6 cSt in a weight ratio of 50:50 at room temperature and mixed at room temperature by rolling for 12 hours. The mixtures' appearance was observed after homogenization and again after 24 hours. The copolymer is deemed compatible with the polyalphaolefine when no phase separation was observed after 24 hours.

The results demonstrated that the ethylene copolymers are miscible with very unpolar low viscosity polyalphaolefines (typically based on poly(1-decen)).

TABLE 4

Miscibility with PAO-6 (50:50 vol %)

| Ex. | Monomers | Amounts [wt %] | Miscible |
|---|---|---|---|
| 1 | E - EHA | 38.5:61.5 | Yes |
| 2 | E - NBA - EHA | 33:31:36 | Yes |
| 3 | E - NBA - LA | 35:33:32 | Yes |

The invention claimed is:

1. A middle-pressure polymerization process for the preparation of an ethylene copolymer which is liquid at room temperature which comprises in polymerized form
    20 to 60 wt % of ethylene; and
    at least 20 wt % of an acrylate, which comprises
        a polar acrylate selected from $C_1$-$C_5$ alkyl (meth)acrylate, and
        an unpolar acrylate selected from $C_6$-$C_{22}$ alkyl (meth)acrylate,
where a monomer mix comprising the ethylene and the acrylate is polymerized at a pressure of 50 to 400 bar and in the presence of at least 2 wt % of a chain transfer agent, where the percentage of the chain transfer agent is based on the sum of the amounts of monomers and the chain transfer agent.

2. The polymerization process according to claim 1, where the chain transfer agents are saturated or unsaturated hydrocarbons, aliphatic ketones, aliphatic aldehydes, or hydrogen, or mixtures thereof.

3. The polymerization process according to claim 1, where the monomer feed is polymerized in the presence of 4 to 18 wt % of the chain transfer agent.

4. The polymerization process according to claim 1, where the polymerization process is a fed-batch process in which a reactor is partly filled with the ethylene and a solvent, followed by feeding of the acrylate, the chain transfer agent, and an initiator.

5. The polymerization process according to claim 1, where the polymerization process is carried out at a pressure in the range from 70 to 300 bar.

6. The polymerization process according to claim 1, where the monomer mix is polymerized in a polymerization solvent.

7. The polymerization process according to claim 1, where the ethylene copolymer comprises in polymerized form at least 30 wt % of the acrylate.

8. The polymerization process according to claim 1, where the polar acrylate is methyl (meth)acrylate, ethyl (meth)acrylate, n-propyl (meth)acrylate, or n-butyl (meth)acrylate.

9. The polymerization process according to claim 1, where the unpolar acrylate is selected from $C_8$-$C_{18}$ alkyl (meth)acrylate, in particular from $C_8$-$C_{12}$ alkyl (meth)acrylate.

10. The polymerization process according to claim 1, where the unpolar acrylate is selected from (meth)acrylates of n-octyl, isooctyl, 2-ethylhexyl, n-nonyl, 2-propylheptyl, n-decyl, un-decyl, dodecyl, tridecyl, tetradecyl, pentadecyl, hexadecyl, heptadecyl, octadecyl, 2-butyloctyl, 2-pentylnonyl, 2-hexyldecyl, isohexyl, isoheptyl, isooctyl, isononyl, isodecyl, isoundecyl, isododecyl, isotridecyl, isotetradecyl, isopentadecyl, isohexadecyl, isoheptadecyl, isooctadecyl and mixtures thereof.

11. The polymerization process according to claim 1, where the ethylene copolymer comprises in polymerized form
    25 to 55 wt % of ethylene,
    at least 20 wt % of the polar acrylate which is selected from $C_1$-$C_4$ alkyl (meth)acrylate, and
    at least 15 wt % of the unpolar acrylate which is selected from $C_6$-$C_{22}$ alkyl (meth)acrylate.

12. A liquid ethylene copolymer obtainable by the polymerization process as defined in claim 1.

13. A lubricant comprising the liquid ethylene copolymer obtainable by the polymerization process as defined in claim 1.

14. A method for reducing friction between moving surfaces comprising the step of contacting the surfaces with the lubricant as defined claim 13.

15. The polymerization process according to claim 1, where the ethylene copolymer comprises in polymerized form at least 50 wt % of the acrylate.

* * * * *